US005645254A

United States Patent [19]

Ng et al.

[11] Patent Number: 5,645,254

[45] Date of Patent: Jul. 8, 1997

[54] SEASONAL DECORATION MOUNTING ARRANGEMENT

[75] Inventors: Samuel Ng; David A. Parshad, both of Ontario, Canada; Charles W. Fennessy, Lemont, Ill.

[73] Assignee: Noma, Inc., Toronto, Canada

[21] Appl. No.: 382,971

[22] Filed: Feb. 2, 1995

[51] Int. Cl.$^6$ ...................................................... F16B 47/00

[52] U.S. Cl. .................................... 248/206.2; 248/205.5; 248/291.1; 248/316.7; 248/467; 248/683

[58] Field of Search .............................. 248/205.2, 206.2, 248/288.31, 683, 291.1, 316.7, 481, 467, 205.5

[56] References Cited

U.S. PATENT DOCUMENTS

| | | | |
|---|---|---|---|
| 4,872,721 | 10/1989 | Sniadach | 248/205.5 X |
| 4,882,862 | 11/1989 | Slavsky, Sr. | 40/324 |
| 5,110,078 | 5/1992 | Gary . | |
| 5,402,974 | 4/1995 | Adams | 248/205.5 |
| 5,407,158 | 4/1995 | Baird | 248/205.5 |

FOREIGN PATENT DOCUMENTS

| | | |
|---|---|---|
| 927596 | 5/1963 | United Kingdom . |
| 2261018 | 5/1993 | United Kingdom . |

*Primary Examiner*—Alvin C. Chin-Shue
*Assistant Examiner*—Richard M. Smith
*Attorney, Agent, or Firm*—Kirschstein, et al.

[57] ABSTRACT

An arrangement for mounting holiday decorations on a smooth surface of a support includes a mounting element that has a bifurcated first end portion forming a first channel for receiving a portion of a garland, and a bifurcated second end portion forming a second channel for receiving a portion of a greeting card. The mounting arrangement further includes a suction cup component constructed to suctionally adhere to the smooth support surface, with the mounting element being connected with the suction cup component.

1 Claim, 3 Drawing Sheets

FIG.1
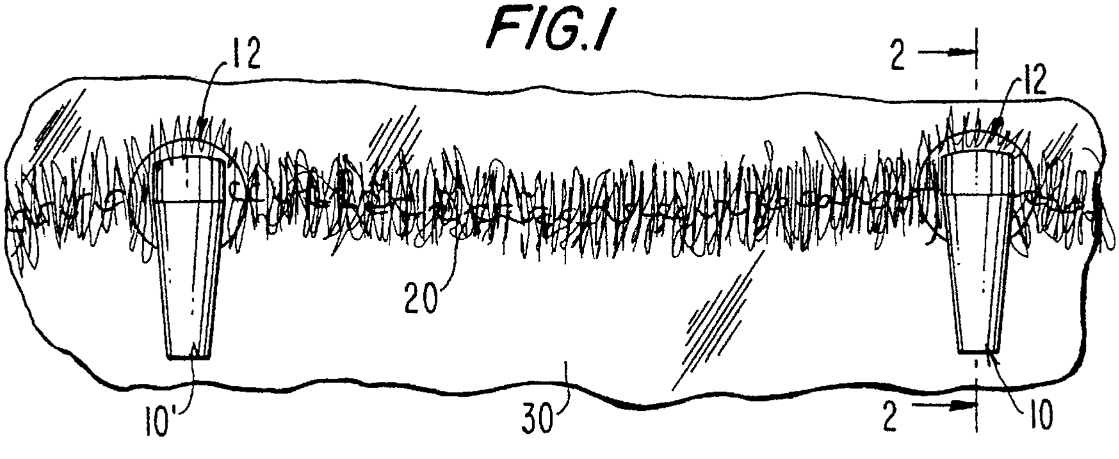
FIG.2
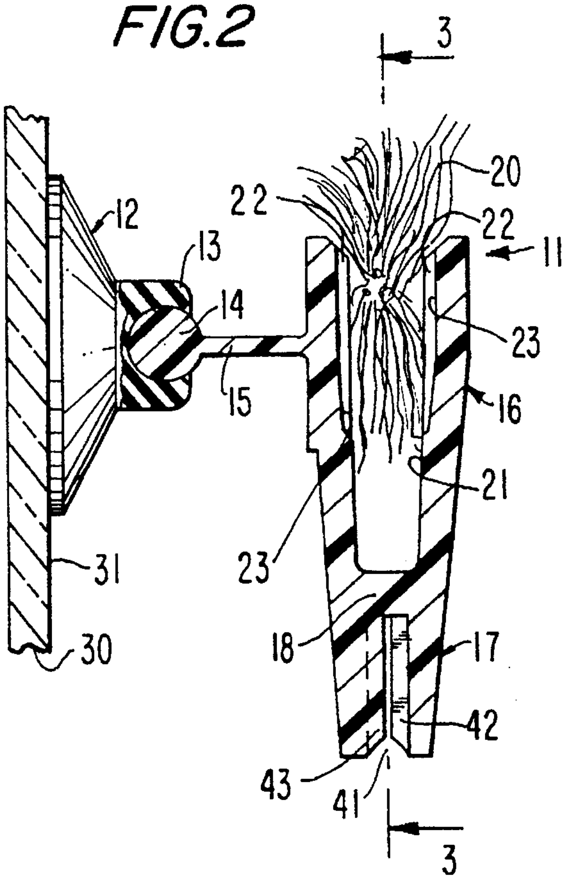
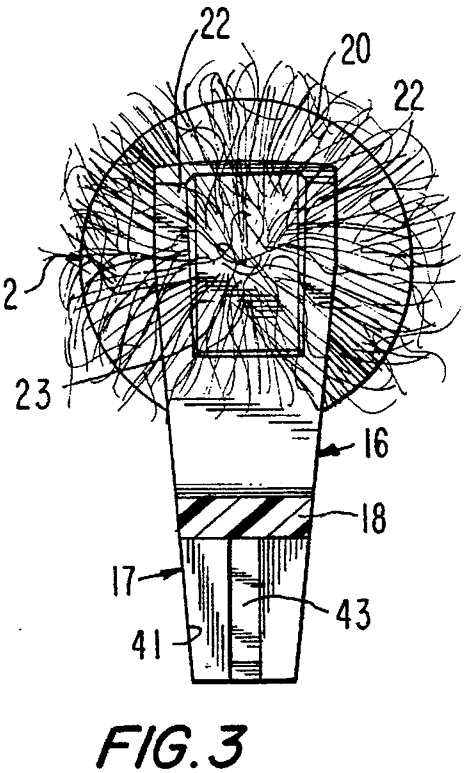
FIG.3

FIG. 5
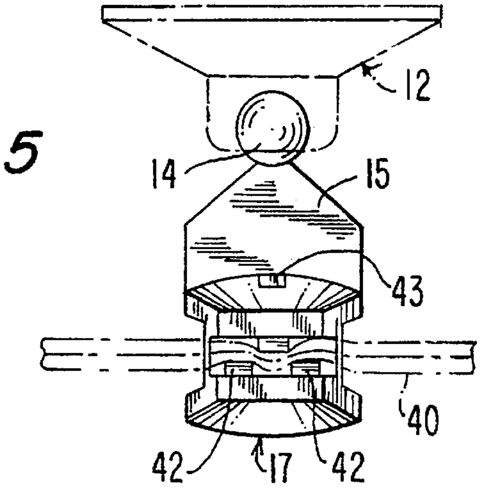
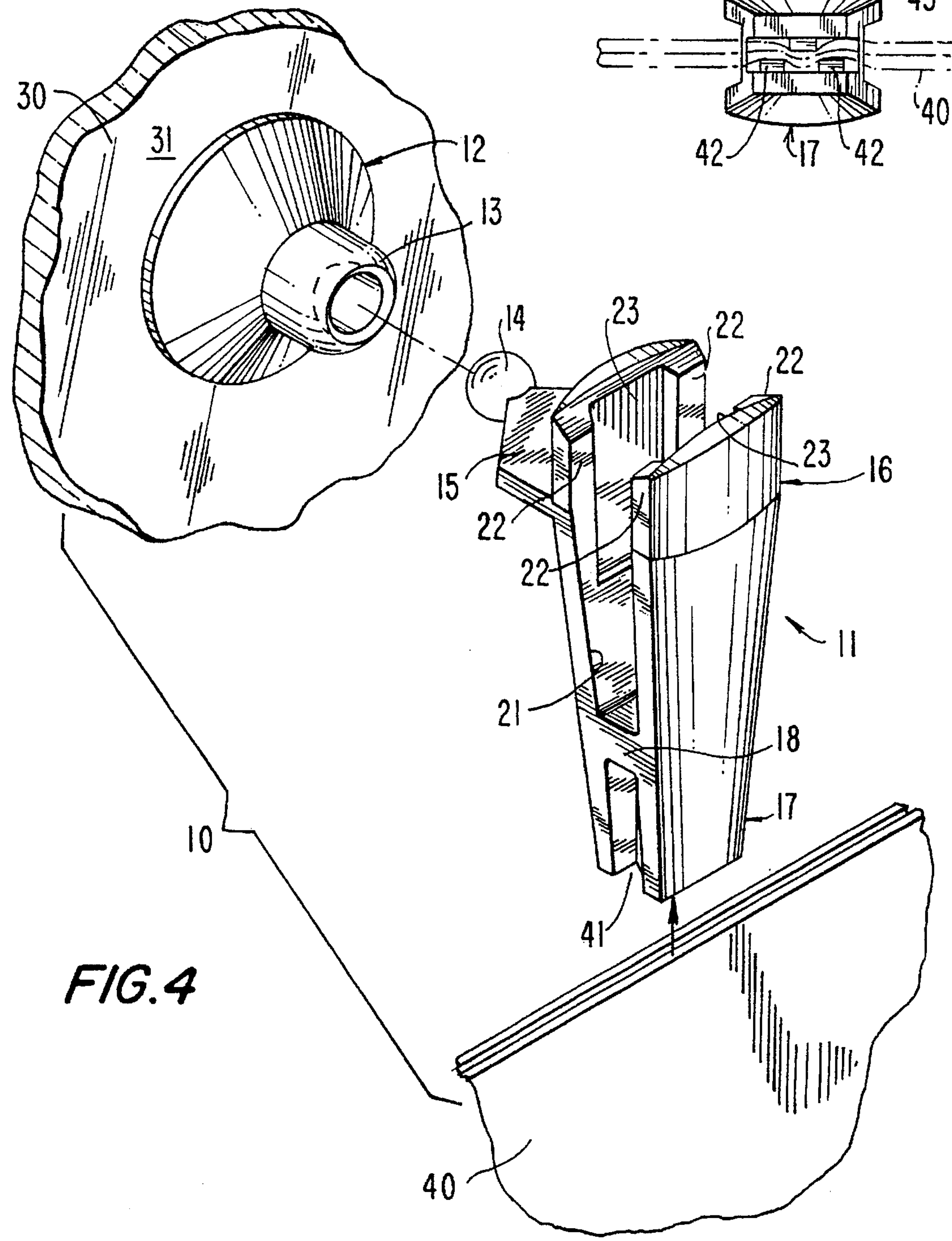
FIG. 4

SEASONAL DECORATION MOUNTING ARRANGEMENT

BACKGROUND OF THE INVENTION

1. Field of the Invention

The present invention relates to mounting arrangements in general, and more particularly to arrangements for holding holiday decorations such as garlands and season's greetings or Christmas cards on or at substantially flat vertical surfaces such as windows, mirrors, door frames or the like.

2. Description of the Related Art

There are already known various constructions of arrangements for attaching a wide variety of decorative articles to diverse supports, among them such that are constructed for holding miniature lights arranged in a light set or chain on but at a distance from respective substantially vertical flat surfaces, such as mirrors, windows, or door frames. An example of a holding arrangement of this type is disclosed in the U.S. Pat. No. 5,110,078.

As disclosed there, the miniature light is confined and held between two arms of a bifurcated support member that, in turn, is supported on a suction cup, which in use is held by vacuum on a substantially smooth support surface, for swivelling about an axis extending substantially normally to the support surface. This renders it possible to adjust the angular position of the miniature light about this axis as desired. While this arrangement may perform well in the application for which it was designed, it is totally unsuited for any other purposes, such as for supporting garlands and/or Christmas cards or similar objects. Yet, there is a pronounced unfilled need for mounting arrangements capable of performing just such tasks.

OBJECTS OF THE INVENTION

Accordingly, it is a general object of the present invention to avoid the disadvantages of the prior art.

More particularly, it is an object of the present invention to provide an arrangement for mounting holiday decorations, which does not possess the drawbacks of the known arrangements of this type.

Still another object of the present invention is to devise a mounting arrangement of the type here under consideration that is capable of reliably supporting objects different from miniature lights on substantially flat and smooth vertical surfaces.

It is yet another object of the present invention to design the above arrangement in such a manner as to be able simultaneously to support at least two decorative objects of different shapes, especially a garland and a greeting card.

A concomitant object of the present invention is so to construct the mounting arrangement of the above type as to be relatively simple in construction, inexpensive to manufacture, easy to use, and yet reliable in operation.

SUMMARY OF THE INVENTION

In keeping with the above objects and others that will become apparent hereafter, one feature of the present invention resides in an arrangement for mounting holiday decorations on a smooth surface of a support. The arrangement of the invention includes a mounting element having a bifurcated first end portion forming a first channel for receiving a portion of a garland, and a bifurcated second end portion forming a second channel for receiving a portion of a greeting card, and a suction cup component constructed to suctionally adhere to the smooth support surface. Appropriate connecting means connects the mounting element with the suction cup component. A particular advantage of the arrangement as described so far is that it is constructed to engage and hold decorative items, such as a garland and a greeting card, that traditionally have not been supported, at least not simultaneously, on arrangements of this kind.

According to an advantageous aspect of the present invention, the bifurcated first end portion of the mounting element includes two first arms defining the first channel, each of the first arms having a pair of spaced ribs substantially aligned with those of the other of the first arms for constricting the cross section of the first channel thereat. Furthermore, the bifurcated second end portion of the mounting element advantageously includes two second arms defining the second channel, one of the second arms having a pair of spaced ribs and the other having a single rib situated substantially midway between the ribs of the pair for forming a tortuous path for the passage of the portion of the greeting card therethrough.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a front elevational view showing two mounting arrangements of the present invention as used to support a garland on a vertical surface;

FIG. 2 is a cross-sectional view, on an enlarged scale, of one of such mounting arrangements, taken on line 2—2 of FIG. 1;

FIG. 3 is another sectional view of the inventive mounting arrangement, taken on line 3—3 of FIG. 2;

FIG. 4 is an exploded view, at a still more enlarged scale, of one of the mounting arrangements of FIG. 1 as used for holding a season's greetings or similar holiday card;

FIG. 5 is a bottom plan view of the mounting arrangement of FIG. 4; and

DETAILED DESCRIPTION OF THE PREFERRED EMBODIMENT

Figure 6:
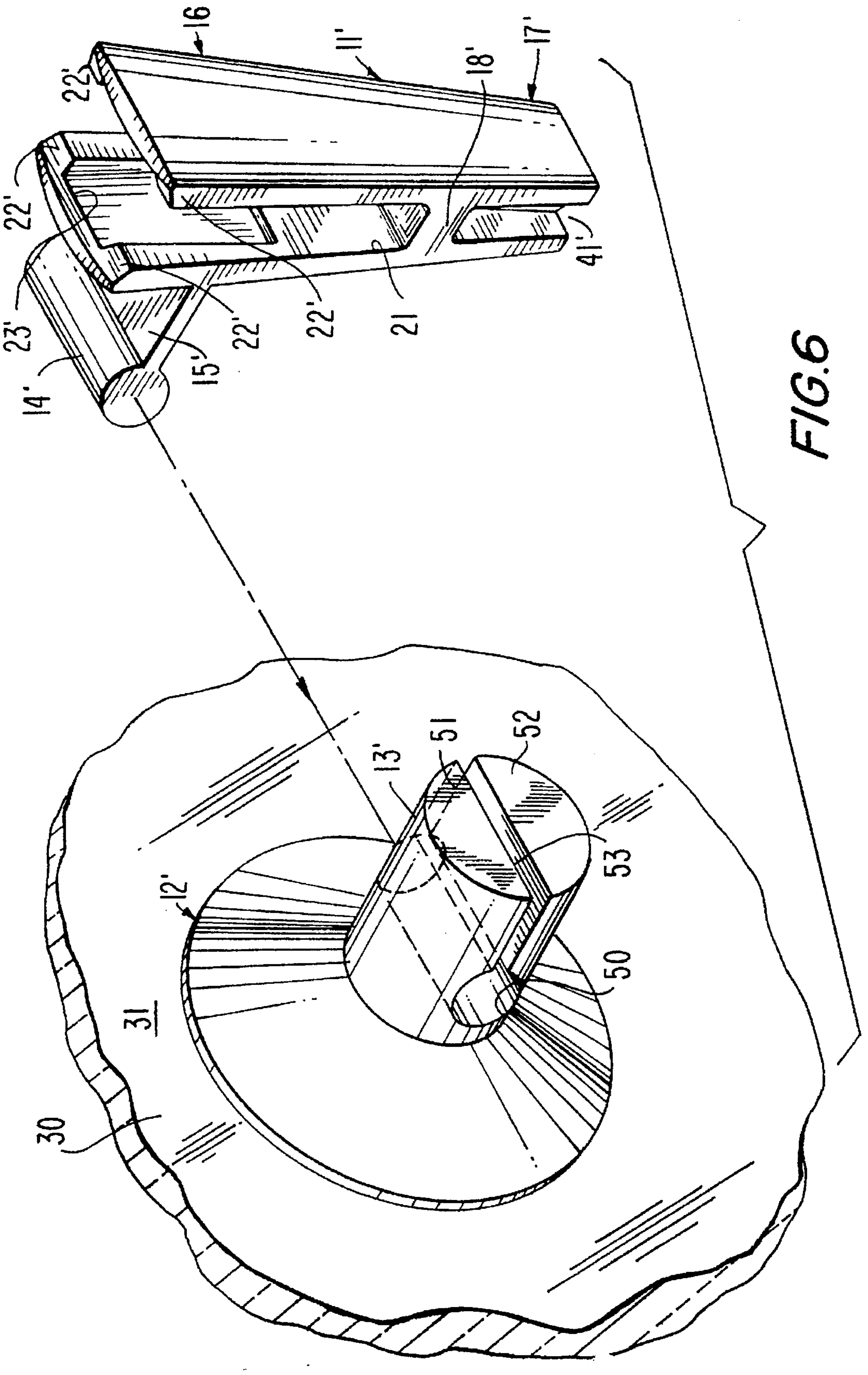
FIG. 6 an exploded view of a modified mounting arrangement according to the present invention.

Referring now to the drawing in detail, and first to FIG. 1 thereof, it may be seen that the reference numerals 10 and 10' have been used therein each to identify one embodiment of a respective mounting arrangement of the present invention in its entirety. Inasmuch as the mounting arrangements 10 and 10' are at least substantially identical, only the arrangement 10 will be described in detail below; however, it is to be understood that the arrangement 10 is just one member of a set that includes, besides the other depicted arrangement 10', a usually considerable number of additional mounting arrangements that are also substantially identical to the arrangement 10 and consequently have not been shown in the drawing. The reason for providing and/or needing a plurality of such arrangements 10, 10' etc. is that they are constructed and configured to hold a garland 20 or a similar elongated element at a plurality of locations distributed along the length of such element 20, with each of the mounting arrangements 10, 10' etc. holding the elongated element 20 at one of such locations.

As a comparison of FIGS. 1 and 2 will reveal, the elongated element 20 is to be attached to a substantially vertically extending surface 31 of a support 30, such as a mirror, a window, a door or window frame, or the like. To provide for such attachment, the mounting arrangement or member 10 includes a holding component 11 and a suction cup component 12 that are connected to one another to form a unit.

As depicted especially in FIG. 2, the connection between the components 11 and 12 is constituted by a ball-and-socket joint consisting of a socket 13 provided on the suction cup component 12 and a ball 14 provided integrally on an extension 15 of the holding component 11. The extension 15 has a length sufficient not only to keep the garland 20 at the requisite distance from the surface 31 of the support 30 but also to permit the holding component 11 to conduct movement about any axis parallel to the surface 31 within the range allowed by the joint 13, 14 itself without abutting the surface 31. Another advantage of giving the extension 15 the aforementioned extended length is that it facilitates the removal of either the holding component 11 from the suction cup component 12, or of the entire mounting member 10 from the support 30 by permitting the person wishing to take such action to insert his or her fingers behind the holding component 11 and then to manipulate it in a manner aimed at achieving the desired effect.

The holding component 11 includes an upper portion 16 which is bifurcated and a lower portion 17 that is bifurcated as well, for reasons that will be explained later. At this juncture, it is to be mentioned that when reference is being had herein to directions, such as upper and lower, left and right, and the like, it relates solely to the orientation assumed in the drawings and has no other significance whatsoever. As a matter of fact, the user may choose to mount the arrangement 10 on a substantially horizontal or sloping surface, and/or to position the "upper" portion 16 below the "lower" portion 17, depending on the effect which the user wishes to achieve. The two parts of each of the bifurcated upper and lower portions 16 and 17 are connected to one another by an integral yoke portion 18.

As mentioned before, the mounting arrangement 10 is intended to support a garland 20 at the particular location at which the mounting arrangement 10 is situated. To this end, the bifurcated upper portion 16 bounds a receiving channel 21 that, as may be observed in FIGS. 2 and 3, is open not only in the upward direction but also to the left and fight as considered in FIG. 3. This permits unimpeded passage of the affected portion of the garland 20 through the channel 21 from front to back as seen in FIG. 2.

Advantageously, the channel 21 is so dimensioned that the arms of the bifurcated upper portion 16 engage the affected portion of the garland 20 with a force sufficient to keep such portion in place as ordinary gravity and other external forces act on the garland 20. This would be a particularly important consideration if the mounting arrangement were to be used in an inverse orientation, that is, with the portion 16 extending down and the channel 21 being open downwardly.

Yet, this feature also plays an important role in situations where the garland 20 is to extend substantially vertically along the sides of the support 20, such as a mirror. This retaining action is further enhanced by providing the arms of the bifurcated upper portion 16 with respective oppositely disposed retaining ribs 22 that reduce the transverse dimension of the channel 21 at their locations and thus increase the retention forces acting thereat on the aforementioned portion of the garland 20.

On the other hand, the retaining ribs 22 bound respective recesses 23 between themselves on each of the aforementioned arms, such recesses 23 serving to provide a relief from the pressure exerted on the garland 20 by the ribs 22 and thus letting the lamellae or similar transversely extending elements of the garland 20 expand to give the garland 20 the desired fluffy appearance even at the location of the respective mounting arrangement 10.

Turning now to FIG. 4 of the drawing, it is to be mentioned that it shows why the lower portion 17 of the holding component 11 is bifurcated as well in accordance with the present invention. The reason for this is that it is desired to use the mounting arrangement 10 for supporting more than just the garland 20; as a matter of fact, the mounting arrangement 10 is constructed to hold even sheet-shaped items 40, such as Christmas cards or the like, in either a suspended position as indicated in FIG. 4, or in any other, non-illustrated position.

To hold the card 40 or the like, the bifurcated lower portion 17 of the holding component 11 has a rather narrow slit-shaped channel 41 therein that separates the respective arms of the bifurcated lower portion 17 from one another. Like the channel 21 of the upper portion 16, the channel 41 of the lower portion 17 is open to the right and to the left as considered in FIG. 5, as well as in a vertical, this time downward, direction. Also like in the case of upper portion 16, the arms bounding the channel 41 of the lower portion 17 of the holding component are provided with respective retaining ribs 42 and 43 extending into the channel 41 and thus constricting its free cross section.

As a comparison of FIGS. 3 and 5 of the drawing will reveal, there are provided two of the retaining ribs 42 each situated at one end of the channel 41, but only one retaining rib 43 which, rather than being located opposite one of the retaining ribs 42, is disposed substantially midway between the retaining ribs 42. As may be observed by viewing FIGS. 2 and 5 of the drawing in conjunction with one another, the transverse spacing between the crest surfaces of the retaining ribs 42 and 43 is smaller than the thickness of the greeting card 40 so that the retaining ribs 42 and 43 define between themselves a tortuous path that can only be negotiated by the card 40 if deformed substantially in the manner indicated in FIG. 5.

Of course, since the card 40 has a certain degree of stiffness, this deformation engendered during the introduction of the card 40 into the slot or channel 41, usually through what is shown to be its downwardly open end, brings about action and reaction forces, and attendant friction forces, between the retaining ribs 42 and 43 and the card 40, the magnitude of such forces being sufficient to keep the card 40 in the channel 41 under normal circumstances, even if the card 40 pends down from the holding arrangement 10 in the manner indicated in FIG. 4.

In the modified embodiment of FIG. 6, the holding component 11 is identical to that described above, except in the following respects. Like parts have been identified by primed numerals. Rather than a ball 14, a cylindrical element 14' is integrally provided on a generally rectangular extension 15'. The socket 13' includes a cylindrical seat 50 for receiving the cylindrical element 14', and a pair of flaps 51, 52 bounding a slit 53 for receiving the extension 15'. The flaps 51, 52 hold the extension 15' in place when the holding element is slid into the seat 50. The resulting structure is less prone to accidental turning of the holding element relative to the suction cup component.

It will be understood that each of the elements described above, or two or more together, may also find a useful application in other types of constructions differing from the type described above.

While the present invention has been described and illustrated herein as embodied in a specific construction of an arrangement for mounting garlands, greeting cards and similar festive items on vertically extending smooth surfaces, it is not limited to the details of this particular construction, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for mounting holiday decorations on a smooth surface of a support, comprising:

a) a mounting element having a bifurcated first end portion forming a first channel for receiving a portion of a garland, said bifurcated first end portion of said mounting element including two first arms defining said first channel, each of said first arms having a pair of spaced ribs substantially aligned with those of the other of said first arms for constricting the cross section of said first channel thereat, and a bifurcated second end portion forming a second channel for receiving a portion of a greeting card, said bifurcated second end portion of said mounting element including two second arms defining said second channel, one of said second arms having a pair of spaced ribs and the other having a single rib situated substantially midway between said pair of ribs for forming a tortuous path for the passage of said portion of said greeting card therethrough, each of said ribs extending along a longitudinal direction;

b) a suction cup component constructed to suctionally adhere to the smooth support surface, said suction cup component having a socket bounding a cylindrical seat, said seat having flaps; and c) means for connecting said mounting element with said suction cup component, said connecting means including a generally planar extension extending from said mounting element in a plane generally perpendicular to said longitudinal direction, said extension having opposite planar surfaces engaged by said flaps, said connecting means also having a cylindrical joint portion mounted in said cylindrical seat.

* * * * *